Patented Nov. 4, 1947

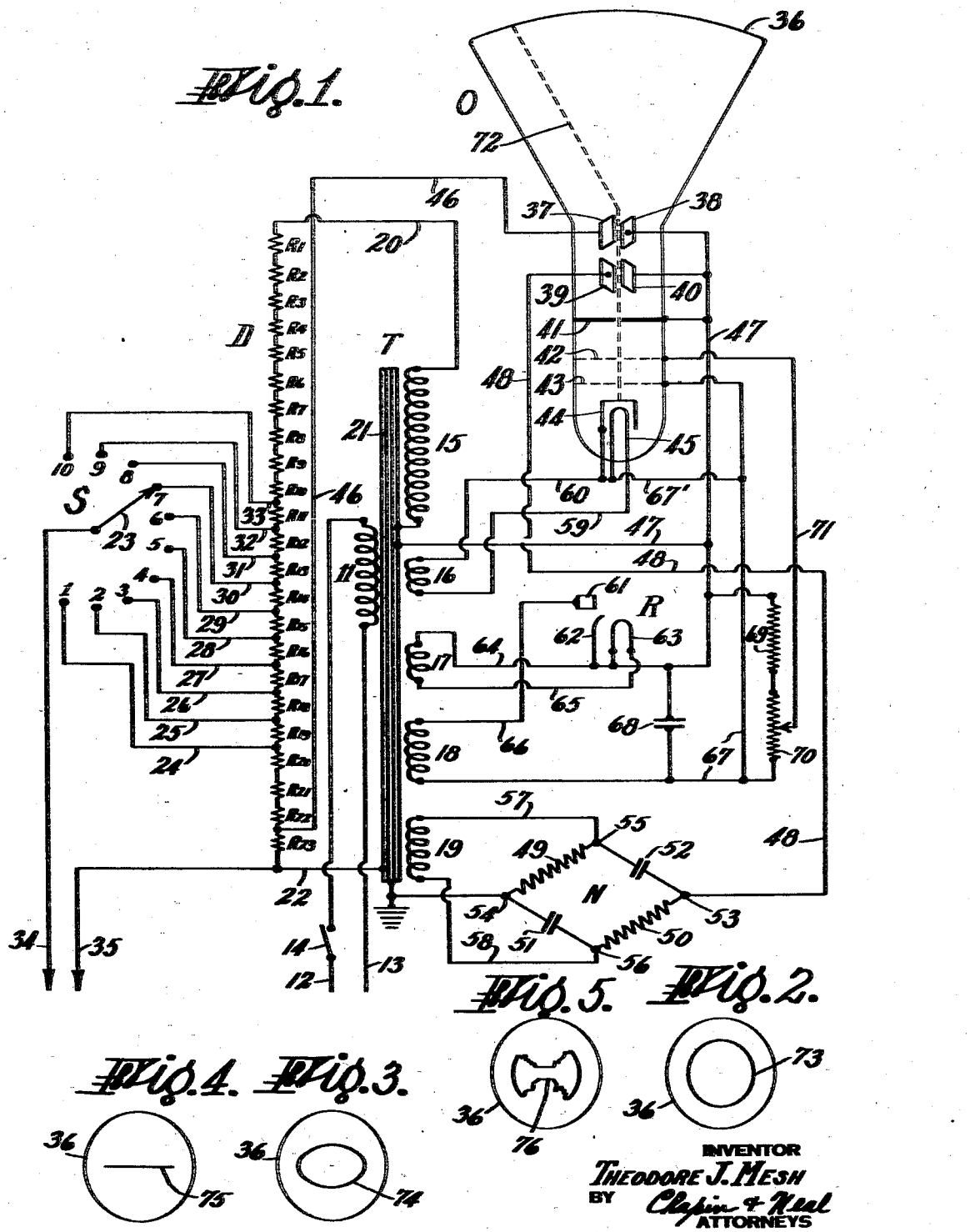

2,430,069

UNITED STATES PATENT OFFICE 2,430,069

APPARATUS FOR TESTING SPARK PLUGS

Theodore J. Mesh, Easthampton, Mass., assignor to Gilbert & Barker Manufacturing Company, West Springfield, Mass., a corporation of Massachusetts Application December 2, 1944, Serial No. 566,369

4 Claims. (Cl. 175—183)

This invention relates to improvements in apparatus for testing spark plugs, ignition leads and the like for the purpose of determining the leakage therethrough and/or determining the length of the spark gap in the case of a spark plug.

The invention has for its general object the provision of a testing apparatus which will enable spark plugs to be tested without removing them from the engine and which will give a visual indication of the condition of a spark plug, so far as leakage is concerned, giving different indications for carbonized, cracked, shorted and perfect plugs.

More particularly, the invention has for an object the provision of a testing apparatus of the class described, which makes use of a cathode ray oscilloscope, on the screen of which may be shown patterns of various shapes corresponding to different conditions of a spark plug, such as a circular pattern for a perfect plug, an elliptical pattern for a leaky plug and a straight line for a shorted plug.

The invention also has for an object to provide in connection with the apparatus described, a means for readily measuring the gap length of the spark plug without removing it from the engine for the purpose of detecting gaps which are too long or too short, characterized in that the gap is measured by the amount of voltage which it is necessary to apply to the plug to produce a spark and in that the oscilloscope shows when sparking occurs.

The invention will be disclosed with reference to the accompanying drawings in which, Fig. 1 is a diagrammatical view of a testing apparatus embodying the invention; and Figs. 2, 3, 4 and 5 are views showing various forms of patterns produced on the oscilloscope screen and representing the various conditions found in testing spark plugs.

Referring to Fig. 1, the apparatus includes a transformer T, having a primary winding 11, which is connected by wires 12 and 13, including an interposed switch 14, to a suitable source of supply of alternating current, such for example as the usual 110 volt, 60 cycle lighting circuit. The transformer has five secondary windings 15, 16, 17, 18 and 19, from which the various voltages required for the apparatus are derived.

The apparatus also includes a high-resistance voltage-divider D made up of a plurality (13 as shown) of resistors R11 to R23 inclusive which are connected in series across a circuit from the high voltage secondary winding 15 which may for example be 5000 volts. Included in series with this circuit is a permanent high resistance made up of a plurality (10 as shown) of resistors R1 to R10 inclusive. As shown, a wire 20 connects one terminal of secondary 15 to resistor R1. The other terminal of this secondary is connected to the transformer core 21, which is grounded. The resistor R23 is also grounded by means of a wire 22. In the present embodiment of the invention, the resistors R1 through R10 may be 200,000 ohms each; the resistors R11 through R18 may be 500,000 ohms each; the resistors R19 through R22 may be one megohm each; and the resistor R23 may be 120,000 ohms. All these resistors may be of one watt size. That portion of the voltage divider between R1 and R10 is broken up into a number of units for the purpose of limiting the voltage applied to each one.

Associated with this voltage divider is a selector switch S which includes a series of contacts 1 to 10 inclusive and a cooperating blade 23 manually movable into engagement with any of the contacts. Contacts 1 to 10 are respectively connected by wires 24 to 33 to the upper terminals of resistors R20 to R11. The switch blade 23 is connected to one test lead 34 and the other test lead 35 is connected to the lower and grounded terminal of resistor R23.

A cathode ray oscilloscope tube is represented generally by O. Its circular screen is designated 36; its upper deflecting plates 37 and 38; its lower deflecting plates 39 and 40; its tubular anode 41; its focusing anode 42; its control grid 43; its cathode 44 and its cathode heating filament 45.

The deflecting plate 37 is connected by a wire 46 to the upper terminal of resistor R23 while the plate 38 is connected by a wire 47 to the transformer core 21 and thus grounded. A supply of alternating current at constant frequency say 60 cycles and at about 60 volts is thus provided for the upper pair of deflector plates. The deflector plate 39 is connected by a wire 48 to a phase-shifting network N. The plate 40 is connected to ground wire 47. This network N, as herein shown, consists of two 25,000 ohm resistors 49 and 50 and two capacitors 51 and 52 of .1 microfarad capacity arranged in the bridge formation shown with one output terminal 53 connected to wire 48 and the other output terminal 54 grounded. The input terminals 55 and 56 are connected by wires 57 and 58, respectively, to the terminals of transformer secondary 19 which supplies alternating current at the same and constant frequency and at about 60 volts. The lower deflector plates are thus supplied with a voltage substantially equal to that with which the upper deflecting plates are supplied but, by means of the network N, the voltage on the lower deflector plates is 90° out of phase with the voltage supplied to the upper deflector plates.

The cathode heater 45 is supplied with current from the six volt secondary 16. One terminal of filament 45 is connected by a wire 59 to one terminal of secondary 16. The other terminal of the secondary 16, the cathode 44 and the other terminal of filament 45 are interconnected by a wire 60.

The direct current potential for tube O is obtained from the transformer secondary 18 and a rectifier tube R. The plate and cathode of tube R are indicated at 61 and 62, respectively, and its cathode heater is indicated at 63. The heater 63 is connected by wires 64 and 65 to the six volt secondary winding 17. Cathode 62 is connected to wire 64 and the latter is connected to ground wire 47. The plate 61 is connected by a wire 66 to one terminal of secondary 18 and the other terminal of the latter is connected by a wire 67 to the control grid 43. A filter condenser 68 is bridged across the wires 64 and 67. Resistors 69 and 70, of 150,000 and 50,000 ohms, respectively, are connected in series and also bridged across wires 64 and 67. Resistor 70 is variable and its adjustable member is connected by a wire 71 to the focusing anode 42. The cathode 44 is connected by a wire 67' to the wire 67.

The connections described to the tubes O and R are conventional except those to the deflecting plates 37, 38 and 39, 40. The upper plates 37, 38 have a voltage applied to them from the voltage divider and this voltage may be varied from zero to a maximum depending on the resistance applied across the test leads. The lower plates 39, 40 have applied to them a voltage substantially equal to the maximum voltage applied to plates 37, 38 but 90° out of phase with the latter. The effect, when equal voltages are applied to both sets of deflector plates and said voltages are 90° out of phase, is to cause equal deflections of electron beam 72 in directions at right angles to one another, thereby producing on screen 36, a rapidly rotating spot of light which appears as a circle, such as indicated at 73 in Fig. 2. This, in itself, is not new. The novelty is in the means, whereby the amplitude of one such voltage may be made to vary according to the leakage through the spark plug or other article being tested. Any reduction in the amplitude of the voltage applied to plates 37, 38, will reduce its deflection of the electron beam 72 and change the pattern on the screen. The circle will be flattened down into an ellipse 74 (Fig. 3) and the ellipse will become progressively more flat as the resistance across the test leads decreases, until it becomes a mere line 75 (Fig. 4) when zero resistance is reached. The greater the leakage across the test leads, the greater the drop in voltage at R23 and the less the voltage applied to plates 37 and 38.

The apparatus involves a divided circuit from the source 15. One path includes wire 20, resistors R1 to R23, wire 22 to ground and the other terminal of the source 15. Another path includes wire 20, resistors R1 to R10 and any others in the series from R11 to R19, depending on the position of switch member 23, the switch member, test lead 34, the plug or other article to be tested, test lead 35, wire 22 to the ground and the other terminal of source 15. It will be noted that the resistors R1 to R10 constitute a high resistance (2 megohms) permanently connected in the circuit between the source 15 and test leads 34, 35, irrespective of the position of switch S. Because of this high resistance, the current flow is very low even when the test leads 34 and 35 are short circuited. Shocks from the "hot" test lead 34 are uncomfortable but not dangerous. No injury to the apparatus can occur because of the high resistance which is permanently included in the test circuit irrespective of the position of switch S.

In operation, the ground test lead 35 is suitably attached to the frame of the automobile or other engine-driven vehicle or to the engine block itself. The other, or so-called "hot" lead 34, is then applied to the terminal of the spark plug, usually while the ignition wire is still attached to the terminal of the plug. The selector switch member 23 is then turned from an "off" position, in which it does not engage any of the contacts 1 to 10, to a position such as the contact 3 or 4, for example. A high voltage is thus applied to the plug but not high enough to break down the gap and cause a spark. If there is no appreciable leakage a substantially circular pattern will appear on the oscilloscope screen because the voltages applied to the two sets of deflector plates are then substantially equal and in ninety degrees phase relation. It should be noted that the apparatus is extremely sensitive and will determine such small leakage as is due to a resistance of 10 megohms across the test leads. A plug may function quite normally with a resistance of one-half megohm. The various plugs are successively tested by applying the test lead 34 to their terminals. If there is substantial leakage, the normal circular pattern on screen 72 will be flattened and will appear as an ellipse. The degree of flattening will vary in direct proportion to the amount of leakage. This is due to the drop in voltage caused by the flow of current across the test leads 34 and 35. This leakage current flowing through the resistors R1 to R16, or R17 as the case may be, causes a drop in voltage, which is directly proportional to the amount of current flowing. And because of the drop in voltage in the resistors named, a drop in voltage is caused in the rest of the circuit including resistor R23, whereby the voltage applied to the ray-deflecting plates 37 and 38 is lowered. In the case of maximum leakage, when test leads 34 and 35 are short circuited, the pattern on the oscilloscope screen will become a straight line due to the fact that no voltage will then be applied to the deflector plates 37 and 38 and the ray 72 will simply be moved back and forth in a straight line. A plug which is firing at the wrong place, as for example, because the porcelain or other insulator is cracked, will produce a somewhat unpredictable pattern, more or less like that shown at 76 in Fig. 5. If there is leakage shown by a change in the form of the pattern on screen 36, then the ignition wire should be disconnected from the plug and the wire and plug separately tested. It should be noted that changes in line voltage balance out. That is, they apply equally to both sets of deflector plates and therefore do not change the shape of the pattern on the oscilloscope screen although they may reduce or increase the magnitude of deflection of the ray and thus the size of the pattern.

If no leakage is found in the plugs, they are then tested for length of spark gap. This is accomplished by turning the selector switch in a direction such as to increase the applied voltage, while the test lead 34 is held on the terminal of the plug. The selector switch is turned until a spark is produced at the plug. The oscilloscope cooperates in this "length of gap" test by showing when the spark occurs. A change in the pattern on screen 36 occurs when the plug fires. The pattern collapses from two opposite sides more or less as indicated in Fig. 5. The tap position of the switch S necessary to produce sparking is used as a reasonably accurate measure of the length of the spark gap. The tap position 7 may be considered, for example, as representing the proper length of gap. If the plug fires, when switch S is on contact 6 or 5, then the gap is too short. If the switch has to be turned to positions 8, 9 or 10, in order to make the plug fire, then the gap is too long. The various tap positions may be calibrated in thousandths of an inch of spark gap length.

The invention thus provides an improved apparatus for testing spark plugs and ignition wires, rapidly and efficiently, without removing the plugs from the engine. High sensitivity is provided for detecting extremely small leakages and the spark gap length may be measured quickly and with sufficient accuracy for the purpose. Ignition wires may be tested for leakage, as above pointed out, and any other article susceptible of treatment in a similar manner may be tested with the apparatus.

I claim:

1. Apparatus for determining leakage in spark plugs, ignition wires or the like, comprising a cathode ray oscilloscope having a screen and two sets of ray deflecting plates, a source of alternating current at constant frequency and of predetermined voltage connected to one set of said plates, a second source of alternating current of the same and constant frequency and of substantially equal voltage ninety degrees out of phase with the first source and connected to the other set of plates, whereby the ray is rotated in a substantially circular path to produce on said screen a substantially circular pattern, test leads adapted for connection to the article to be tested and connected in circuit with one said source so as to cause a drop in the voltage applied to one set of plates when leakage occurs through the article being tested and in proportion to the amount of leakage, whereby the shape of the pattern on said screen may be changed from a circle to ellipses the minor axes of which decrease as the leakage increases and to a straight line in the event of a short circuit across said leads.

2. Apparatus for determining leakage in spark plugs, ignition wires or the like, comprising, a source of alternating current at high voltage and constant frequency, a high resistance voltage divider connected to said source, test leads adapted for connection to the article to be tested and connected at different points to said voltage divider to receive a relatively high voltage therefrom, a cathode ray oscilloscope having a screen and two sets of ray-deflecting plates, one set of said plates connected to said voltage divider to receive a relatively low voltage therefrom, and a second source of alternating current at the same frequency as the first source and at a voltage substantially equal to that applied to the first set of plates but ninety degrees out of phase therewith.

3. Apparatus for determining leakage in spark plugs, ignition wires or the like, comprising, a source of high voltage alternating current at constant frequency, test leads adapted for connection to the terminals of the article to be tested, a high resistance, a circuit including said source, resistance and leads; a high resistance voltage divider connected across said circuit in parallel with said test leads, a cathode ray oscilloscope having a screen and two sets of ray-deflecting plates, a source of relatively low voltage alternating current at constant frequency and the same frequency as the first source, said second source being ninety degrees out of phase with the first source and connected to one set of said plates, the other set of plates being connected to said voltage divider at a point to receive substantially the same voltage as the second source, when there is no substantial leakage across said leads.

4. Apparatus for testing spark plugs and the like, comprising, a source of relatively high voltage alternating current at constant frequency, a high resistance voltage divider connected to said source, a selector switch having a series of contacts connected at different points to the voltage divider and a switch member movable to engage any one of said contacts, test leads adapted for connection to the plugs to be tested and connected one to said switch member and the other to one terminal of the voltage divider, whereby the voltage applied to the plug to be tested may be varied, a cathode ray oscilloscope having a screen and two sets of ray-deflecting plates, one set of plates being connected to said voltage divider at a point to receive a voltage less than any obtainable by said selector switch, a second source of alternating current at the same frequency as the first source and at a voltage substantially equal to that applied to the first-named set of plates, a circuit including the second-named set of plates and second source, and a phase-shifting network connected in said last-named circuit to shift the voltage applied to the second-named set of plates ninety degrees out of phase with the voltage applied to the first-named set of plates.

THEODORE J. MESH.

REFERENCES CITED

The following references are of record in the file of this patent:

UNITED STATES PATENTS

| Number | Name | Date |
| --- | --- | --- |
| 2,306,529 | Davis | Dec. 29, 1942 |
| 2,188,845 | Ramsay | Jan. 30, 1940 |
| 2,366,355 | Roberts | Jan. 2, 1945 |